US008957879B2

(12) United States Patent
Mao

(10) Patent No.: US 8,957,879 B2
(45) Date of Patent: Feb. 17, 2015

(54) PEN HEAD CONFIGURATION STRUCTURE FOR CAPACITIVE TOUCH-SCREEN STYLUS PEN

(75) Inventor: Lianhua Mao, Xiamen (CN)

(73) Assignee: Harda (Xiamen) Plastic Co., Ltd., Xiamen, Fujian (CN)

( * ) Notice: Subject to any disclaimer, the term of this patent is extended or adjusted under 35 U.S.C. 154(b) by 209 days.

(21) Appl. No.: 13/807,705

(22) PCT Filed: Sep. 28, 2010

(86) PCT No.: PCT/CN2010/077423
§ 371 (c)(1),
(2), (4) Date: Dec. 28, 2012

(87) PCT Pub. No.: WO2012/040913
PCT Pub. Date: Apr. 5, 2012

(65) Prior Publication Data
US 2013/0100088 A1 Apr. 25, 2013

(51) Int. Cl.
*G06F 3/033* (2013.01)
*G06F 3/0354* (2013.01)
(52) U.S. Cl.
CPC ........ *G06F 3/03545* (2013.01); *G06F 3/03546* (2013.01)
USPC .......................................................... 345/179
(58) Field of Classification Search
CPC .. G06F 3/03545; G06F 3/044; G06F 3/03546
See application file for complete search history.

(56) References Cited

U.S. PATENT DOCUMENTS

| 5,912,662 | A | * | 6/1999 | Bunn et al. | 345/179 |
| 5,999,170 | A | * | 12/1999 | Ooura et al. | 345/179 |
| 8,355,008 | B2 | * | 1/2013 | Wu | 345/174 |
| 2008/0297493 | A1 | * | 12/2008 | Adkins | 345/179 |
| 2009/0211821 | A1 | * | 8/2009 | Yeh et al. | 178/19.03 |
| 2010/0006350 | A1 | * | 1/2010 | Elias | 178/18.06 |
| 2012/0026091 | A1 | * | 2/2012 | Harper et al. | 345/163 |

* cited by examiner

*Primary Examiner* — Lixi C Simpson

(57) ABSTRACT

A pen head configuration structure for a capacitive touch-screen stylus pen is disclosed, and it includes a pen head and a support saddle for the pen head which are made of conductive materials, and a universal joint is connected between the pen head and the support saddle for the pen head. When the stylus pen is used in practice, the pen body can be used at arbitrary angle through using the connection relationship of the universal joint. However the largest touching area between the pen head and the touching-screen can be kept, so as to ensure the operation performance of the stylus pen.

6 Claims, 8 Drawing Sheets

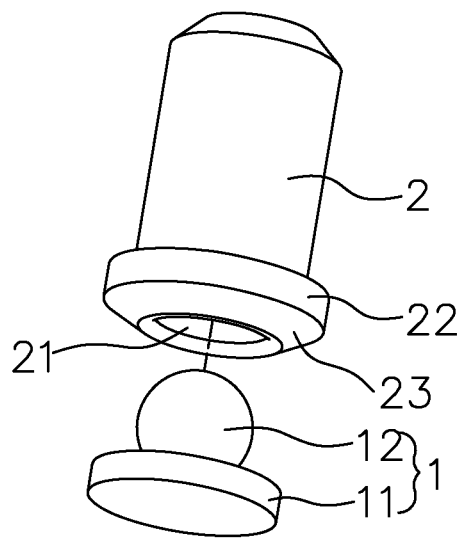
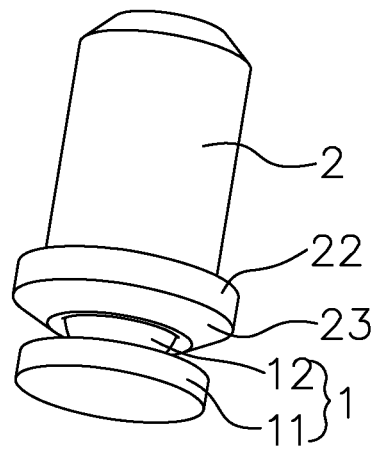
FIG. 1
FIG. 2
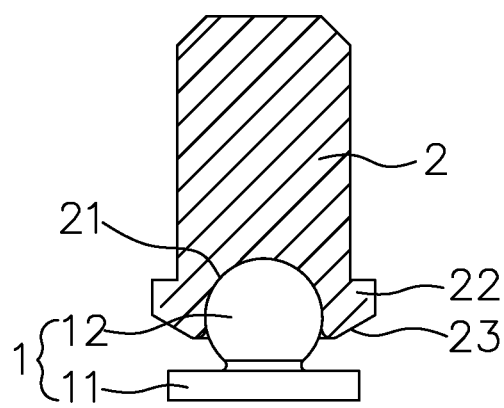
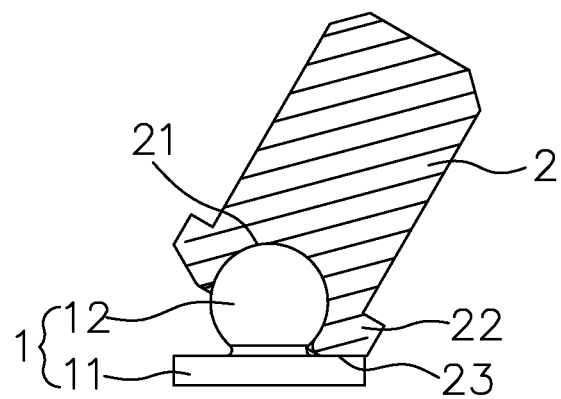
FIG. 2A
FIG. 2B

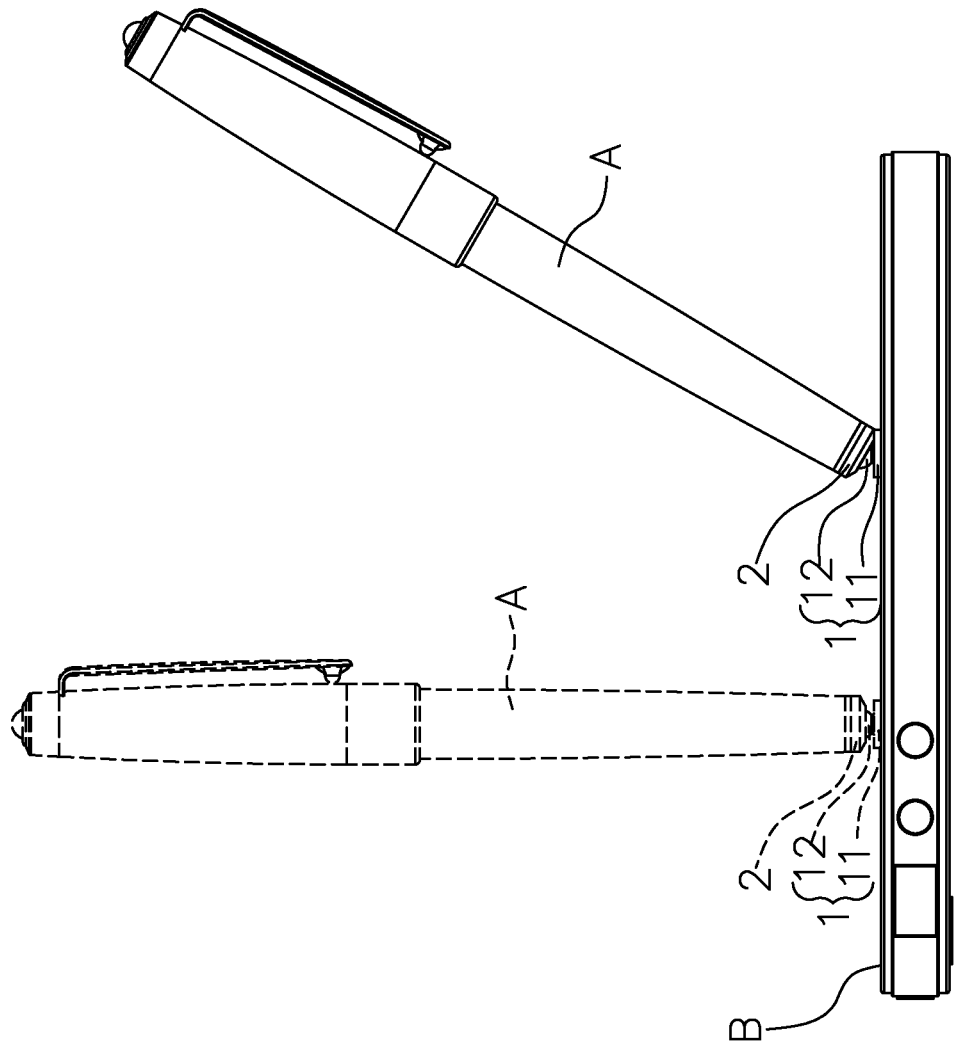
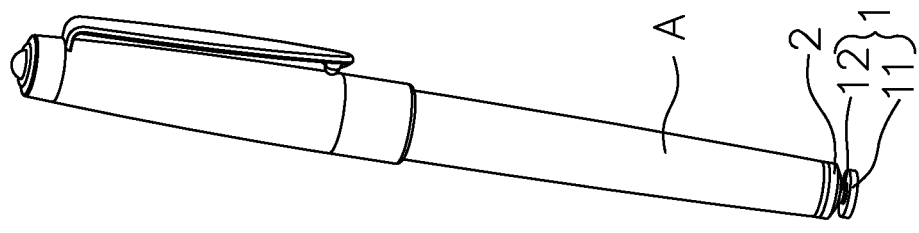

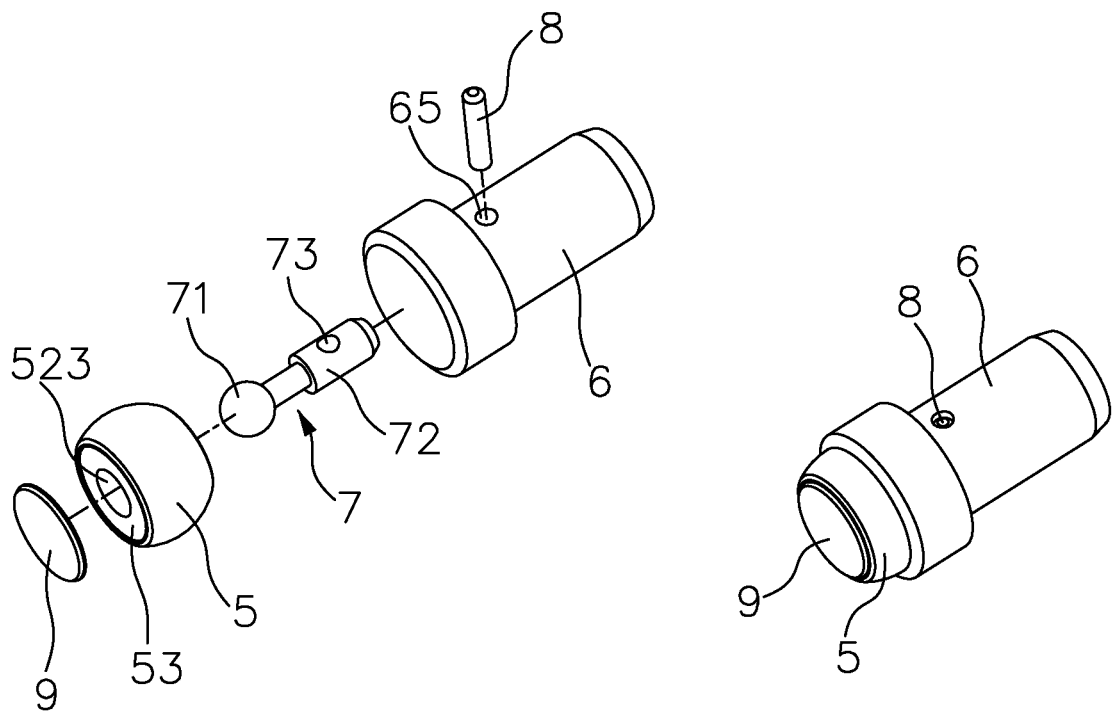
FIG. 13  FIG. 14
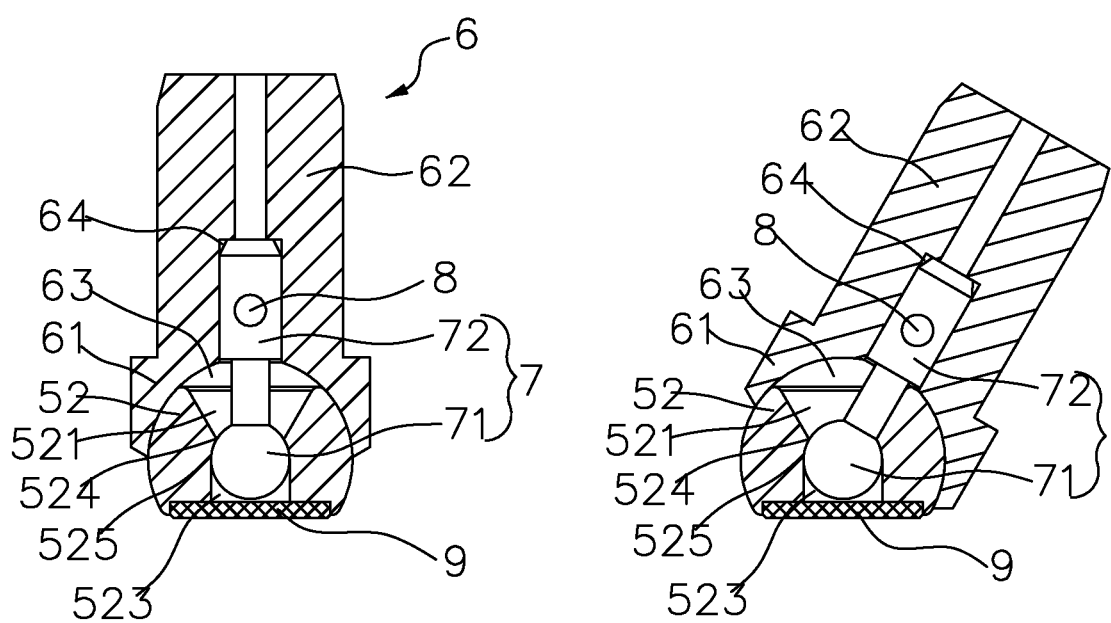
FIG. 14A  FIG. 14B

PEN HEAD CONFIGURATION STRUCTURE FOR CAPACITIVE TOUCH-SCREEN STYLUS PEN

BACKGROUND OF THE INVENTION

1. Field of the Invention

The present invention relates to a touch-screen stylus pen, and more particularly to a pen head configuration structure for a capacitive touch-screen stylus pen.

2. Description of the Prior Art

A capacitive touch-screen comprises a glass screen, a transparent film layer on the glass screen, a conductive layer, and a piece of glass to protect the conductive layer. The design of dual-glass is to protect the conductive layer and a sensor. The principle of the capacitive touch-screen is that when the user's finger touches a metallic layer, the electric field of the human body and the touchscreen will form a coupling capacitance. For high-frequency current, capacitance is a direct conductor. The finger will draw less current from the contact. The current will flow out from the electrodes of the four corners of the touchscreen. The current passing the four electrodes is proportional to the distance from the finger to the four corners. A controller gets the position of the contact by calculating the four current proportions.

There is sweat or other dirty objects on the finger to dirty the touchscreen when writing and to influence the visual effect. Thus, a capacitive touch-screen stylus pen is developed. The capacitive touch-screen stylus pen comprises a conductive pen head and a pen body to transmit the induced current of the human body. As known by the definition of the plate capacitor, the capacitance is proportional to the induction area of the plate capacitor. The pen head of the stylus pen and the touchscreen need to form a surface touch. Conventional stylus pens have the following shortcomings.

1. The pen head has a flat end face, namely, the front end of the pen head has a soft flat face which is perpendicular to the pen rod. When in use, the pen rod subject to the flat end face must be at right angle relative to the touchscreen for the pen head to touch the touchscreen. It is inconvenient for the user who is not familiar with the stylus pen.

2. The pen head has an inclined guide face. The pen head has an angle relative to the pen rod. This is helpful to use the stylus pen at a certain angle only. When the direction is changed, it is laborious to move the pen head on the screen.

3. The pen head has an inclined guide face. This pen head is flexible to move on the screen. If the applied force is too less, the contact area of the pen head to touch the screen is too small to satisfy the stylus function. If the applied force is too great, the contact area of the pen head to touch the screen is larger, but it is difficult to move the pen head.

Accordingly, the inventor of the present invention has devoted himself based on his many years of practical experiences to solve these problems.

SUMMARY OF THE INVENTION

The primary object of the present invention is to provide a pen head configuration structure for a capacitive touch-screen stylus pen which can be used with ease.

A further object of the present invention is to provide a pen head configuration structure for a capacitive touch-screen stylus pen which can be carried conveniently and won't be lost.

In order to achieve the aforesaid objects, the pen head configuration structure for a capacitive touch-screen stylus pen comprises a pen head and a support saddle. The pen head and the support saddle are made of a conductive material. The pen head and the support saddle are connected through a universal joint.

Preferably, the pen head comprises a working portion and a connecting portion. The working portion is an end face. The connecting portion is a spherical head disposed on top of the working portion. The support saddle has a spherical socket with a reduced opening at a lower end thereof to accommodate an upper part of the spherical head of the connecting portion. The spherical head cooperates with the spherical socket to form the universal joint.

Preferably, the depth of the spherical socket is greater than the radius of the spherical head of the connecting portion and less than the diameter of the spherical head.

Preferably, the support saddle has an inclined guide surface at a bottom thereof. The guide surface is upward inclined from the outer periphery of the spherical socket.

Preferably, the support saddle comprises a lower pen head connecting portion and an upper pen body connecting portion. The pen head connecting portion is a spherical head. The pen body connecting portion is a rod body. The pen head is a cylindrical seat. The pen head has a spherical head seat at an upper portion thereof relative to the spherical head of the pen head connecting portion. The spherical head of the pen head connecting portion cooperates with the spherical head seat of the pen head to form the universal joint. The pen head has a lower face as a working face of the pen head to touch a touchscreen.

Preferably, the depth of the spherical head seat is greater than the radius of the spherical head of the pen head connecting portion and less than the diameter of the spherical head.

Preferably, the pen head configuration structure for a capacitive touch-screen stylus pen further comprises a backing member. The pen head has a working end face at a lower end face thereof to touch the touchscreen. The upper part of the pen head is a spherical head. The spherical head has a sphere seat formed therein to mate with a sphere of the backing member. The backing member and the pen head form a universal connection relationship. The support saddle comprises a lower pen head connecting portion and an upper pen body connecting portion. The pen head connecting portion is formed with a spherical seat to accommodate the spherical head of the pen head so that the pen head and the support saddle form the universal connection relationship. The support saddle further has a sink hole disposed above the spherical seat to accommodate the backing member. The backing member is a rod member. The backing member has the sphere at a lower end thereof and a rod body. The rod body of the backing member is inserted into the sink hole of the support saddle.

Preferably, the spherical head is formed with a taper seat which is tapered from top to bottom. The spherical head is formed with the sphere seat near a middle part thereof and facing downward.

Preferably, the depth of the sphere seat is greater than the radius of the sphere of the backing member and less than the diameter of the sphere.

Preferably, the pen head is a spherical crown member made of a conductive material. The upper part of the pen head is the spherical head. The lower end face of the pen head is formed with a recess to accommodate a conductive plate.

Preferably, the spherical head is formed with a taper seat which is tapered from top to bottom. The spherical head is formed with a through hole near a middle part thereof. The diameter of the through hole is greater than or equal to the diameter of the sphere of the backing member. A reduced opening is formed between the through hole and the taper seat. The diameter of the reduced opening is less than the diameter of the sphere of the backing member.

Preferably, the through hole has an arc surface at an upper end thereof.

Preferably, the support saddle is fixed to a pen body or a pen cap of a roller pen. The pen body and the pen cap are made of a conductive material and have a sink seat to mate with the support saddle.

The feature of the pen head configuration structure for a capacitive touch-screen stylus pen of the present invention is the universal connection relationship between the pen head and the support saddle. When the stylus pen is operated, it can satisfy different users to hold the stylus pen at arbitrary angle. However, the largest touching area between the pen head and the touchscreen can be kept, so as to ensure the operation performance of the stylus pen.

The pen body of a roller pen can be direct used as the pen body. The roller pen is direct provided with the capacitive touch-screen stylus pen head, so that the stylus pen can be carried more easily and won't be lost. The longer pen body can be held more conveniently when the stylus pen is used.

BRIEF DESCRIPTION OF THE DRAWINGS

FIG. 1 is an exploded view of a first embodiment of the present invention;

FIG. 2 is a perspective view of the first embodiment of the present invention;

FIG. 2A is a sectional view of the first embodiment of the present invention;

FIG. 2B is another sectional view of the first embodiment of the present invention;

FIG. 3 is a schematic view of the first embodiment of the present invention coupled to a roller pen;

FIG. 4 is a schematic view of the first embodiment of the present invention coupled to a roller pen in a working state;

FIG. 13 is an exploded view of a fourth embodiment of the present invention;

FIG. 14 is a perspective view of the fourth embodiment of the present invention;

FIG. 14A is a sectional view of the fourth embodiment of the present invention;

FIG. 14B is another sectional view of the fourth embodiment of the present invention;

DETAILED DESCRIPTION OF THE PREFERRED EMBODIMENTS

Figure 5:
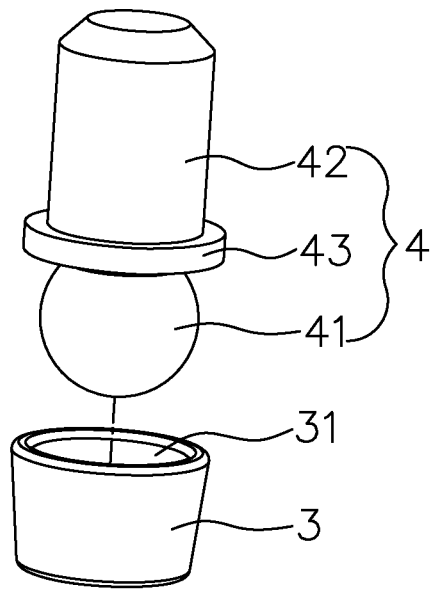
FIG. 5 is an exploded view of a second embodiment of the present invention.
Figure 6:
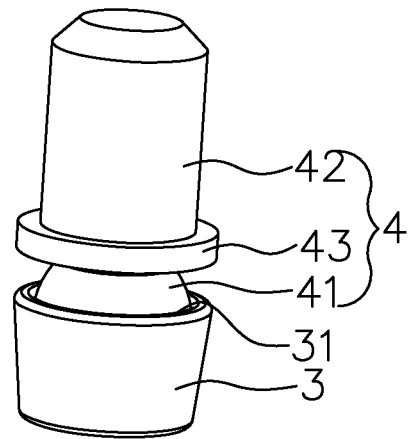
FIG. 6 is a perspective view of the second embodiment of the present invention.
Figure 6A:
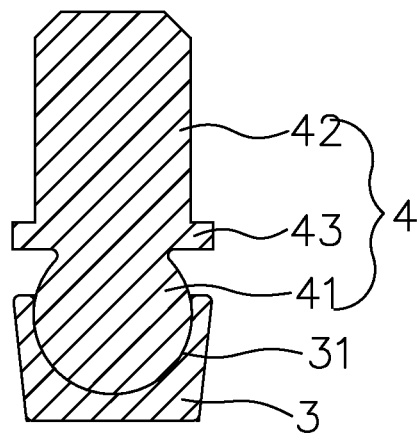
FIG. 6A is a sectional view of the second embodiment of the present invention.
Figure 6B:
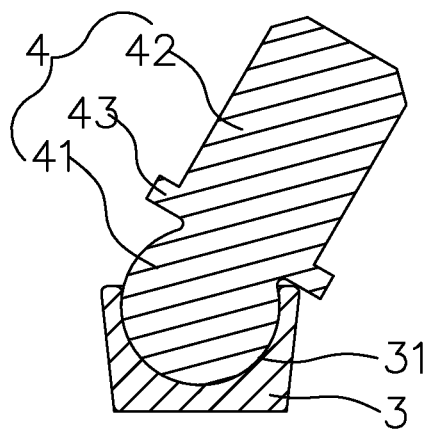
FIG. 6B is another sectional view of the second embodiment of the present invention.

Embodiments of the present invention will now be described, by way of example only, with reference to the accompanying drawings.

As shown in FIG. 1 to FIG. 16, the present invention discloses a pen head configuration structure for a capacitive touch-screen stylus pen and comprises a pen head 1 and a support saddle 2. The pen head 1 and the support saddle 2 are connected through a universal joint. The pen head 1 and the support saddle 2 are made of a conductive material.

As shown in FIG. 1 to FIG. 4, in a first embodiment of the present invention, the pen head 1 comprises a working portion 11 and a connecting portion 12. The working portion 11 is an end face made of a conductive material, namely, the working face of the stylus pen and the touchscreen. The connecting portion 12 is a spherical head disposed on top of the working portion 11. The spherical head is made of a conductive material or a hard conductive material. The support saddle 2 has a spherical socket 21 with a reduced opening at a lower end thereof to accommodate the upper part of the spherical head of the connecting portion 12. That is to say, the depth of the spherical socket 21 is greater than the radius of the spherical head of the connecting portion 12 and less than the diameter of the spherical head. The spherical head cooperates with the spherical socket 21 to form the universal joint. The support saddle 2 has a flange 22 at the lower end thereof. When the upper portion of the support saddle 2 is inserted into the stylus pen, the flange 22 is flush with the lower end of the pen body to be an integral whole. The bottom of the support saddle 2 has an inclined guide surface 23 which is upward inclined from the outer periphery of the spherical socket 21, such that the distance between the working portion 11 of the pen head 1 and the support saddle 2 is increased. Thus, the pen head 1 has a larger movable angle relative to the support saddle 2.

As shown in FIG. 3 and FIG. 4, the pen body of the stylus pen can be separate. The pen body A of a roller pen can be direct used as the pen body. The pen body A is also made of a conductive material so as to conduct the induced current of the human body. The bottom of the pen body A of the roller pen has a sink seat to mate with the upper portion of the support saddle 2. The roller pen is direct provided with the capacitive touch-screen stylus pen head, so that the stylus pen can be carried more easily and won't be lost. The longer pen body can be held more conveniently when the stylus pen is used.

Through the connection relationship of the universal joint between the pen head 1 and the support saddle 2 fixed to the pen body 1, the pen body A can be used at arbitrary angle when the stylus pen is used. However, the largest touching area between the pen head 1 and the touchscreen B can be kept, so as to ensure the operation performance of the stylus pen.

As shown in FIG. 5 to FIG. 8, in a second embodiment of the present invention, the support saddle 4 comprises a lower pen head connecting portion 41 and an upper pen body connecting portion 42. The pen head connecting portion 41 is a spherical head. The pen body connecting portion 42 is a rod body which has a flange 43 at a lower end thereof. When the pen body connecting portion 42 of the support saddle 4 is inserted into the stylus pen, the flange 42 is flush with the lower end of the pen body to be an integral whole. The pen head 3 is a cylindrical seat made of a conductive material. The pen head 3 has a spherical head seat 31 at an upper portion thereof relative to the spherical head of the pen head connecting portion 41. The depth of the spherical head seat 31 is greater than the radius of the spherical head of the pen head connecting portion 41 and less than the diameter of the spherical head. The spherical head of the pen head connecting portion 41 cooperates with the spherical head seat 31 of the pen head 3 to form the universal joint. The pen head 3 has a lower face 32 as the working face of the pen head and the touchscreen.

Figure 8:
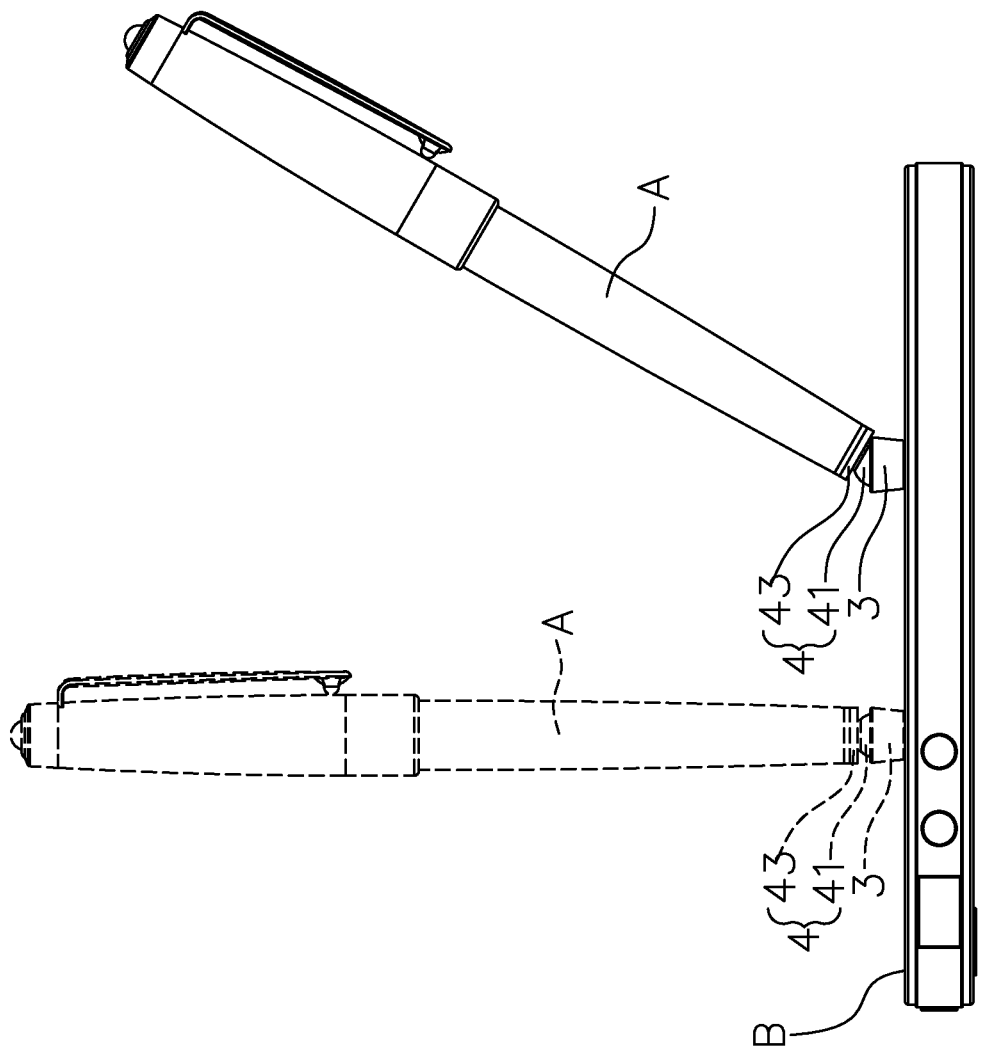
FIG. 8 is a schematic view of the second embodiment of the present invention coupled to a roller pen in a working state.
Figure 7:
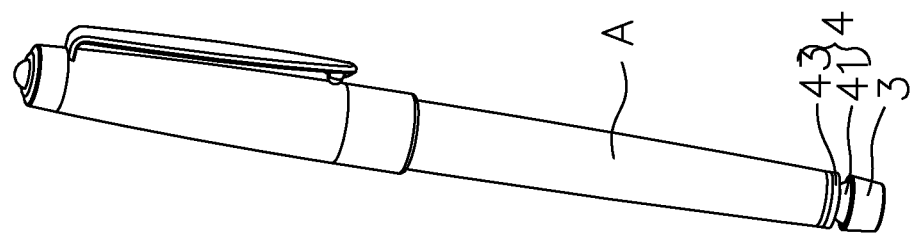
FIG. 7 is a schematic view of the second embodiment of the present invention coupled to a roller pen.
Figure 9:
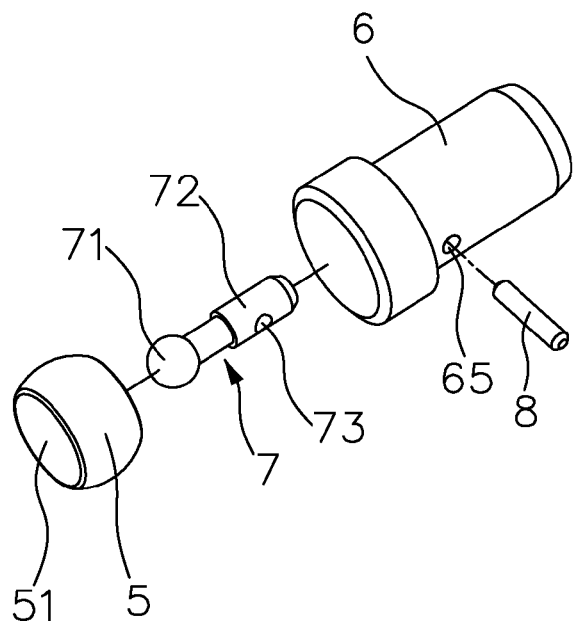
FIG. 9 is an exploded view of a third embodiment of the present invention.
Figure 10:
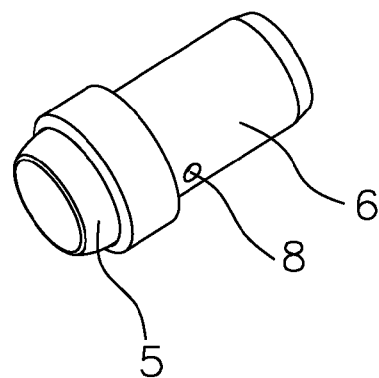
FIG. 10 is a perspective view of the third embodiment of the present invention.
Figure 10A:
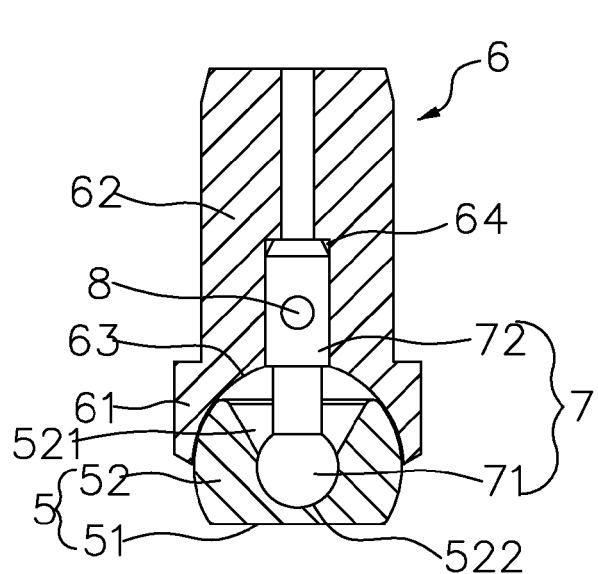
FIG. 10A is a sectional view of the third embodiment of the present invention.
Figure 10B:
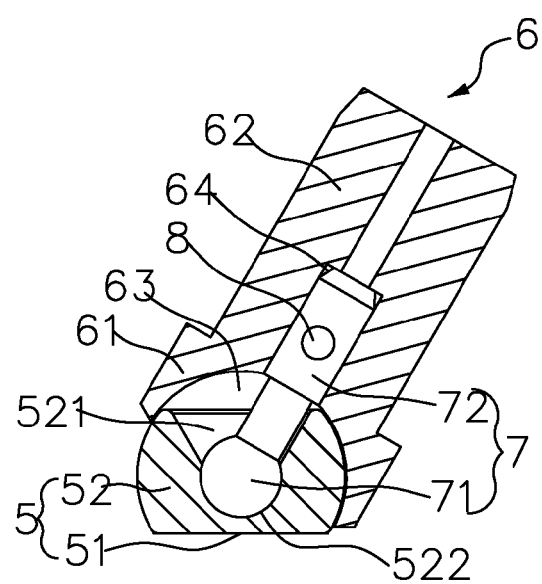
FIG. 10B is another sectional view of the third embodiment of the present invention.
Figure 12:
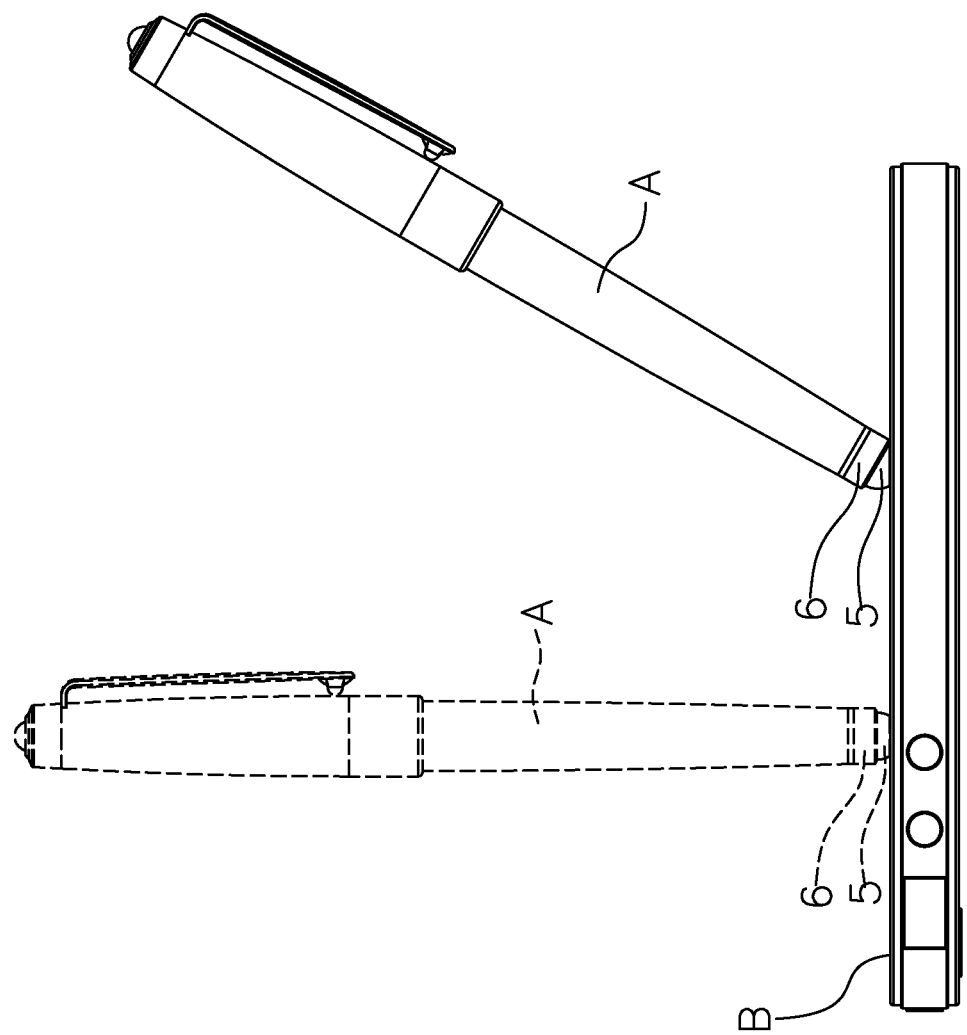
FIG. 12 is a schematic view of the third embodiment of the present invention coupled to a roller pen in a working state.
Figure 11:
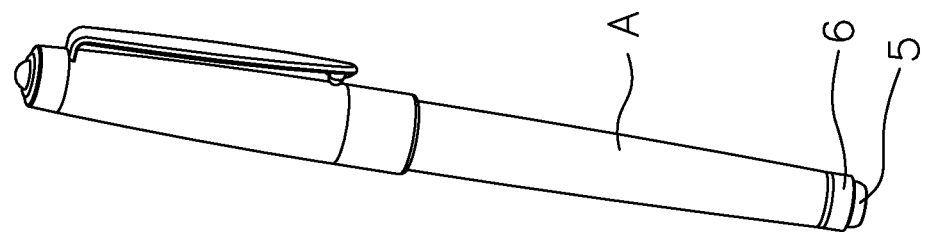
FIG. 11 is a schematic view of the third embodiment of the present invention coupled to a roller pen.
Figure 16:
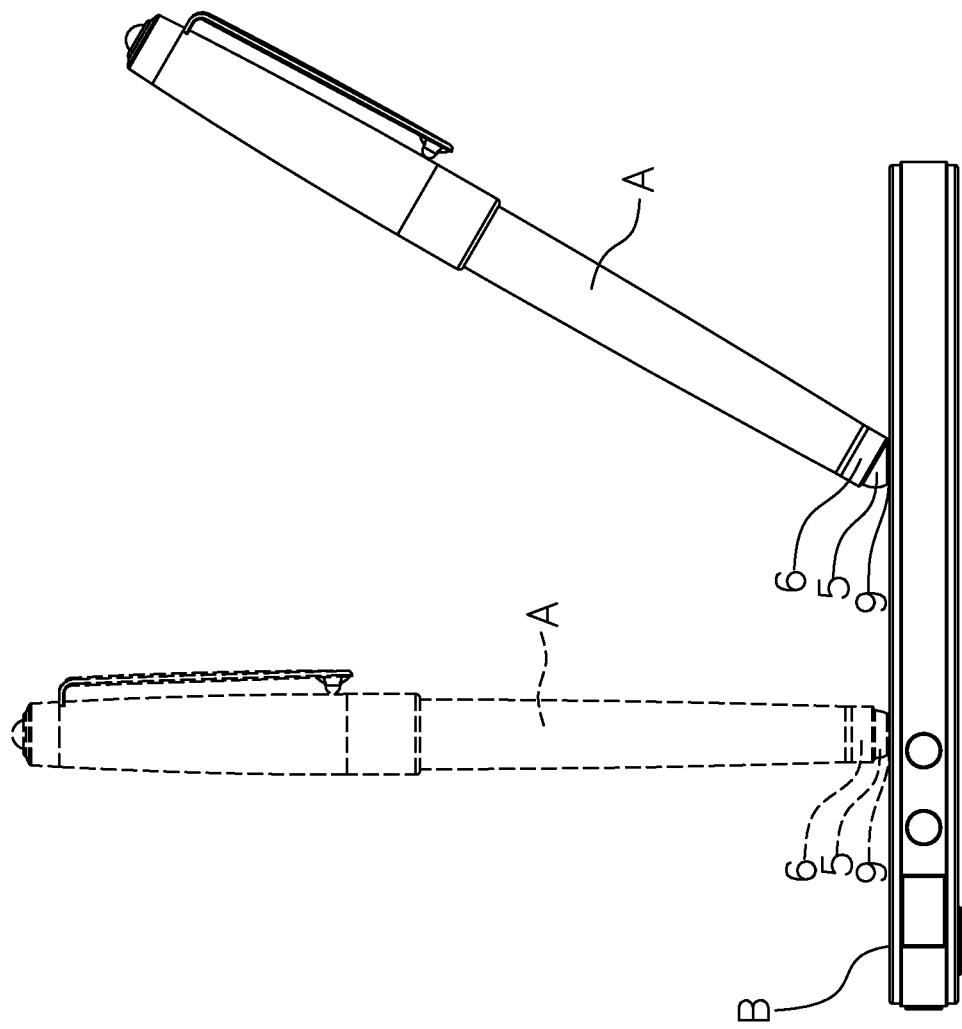
FIG. 16 is a schematic view of the fourth embodiment of the present invention coupled to a roller pen in a working state.
Figure 15:
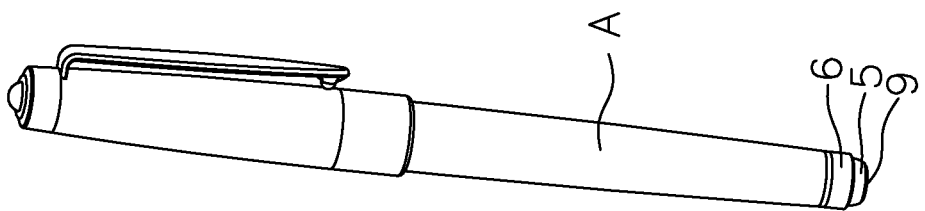
FIG. 15 is a schematic view of the fourth embodiment of the present invention coupled to a roller pen.

As shown in FIG. 7 and FIG. 8, the pen body is the same as the first embodiment by using the pen body A of a roller pen made of a conductive material. The pen body A can be used at arbitrary angle when the stylus pen is used. However, the largest touching area between the pen head 3 and the touchscreen B can be kept, so as to ensure the operation performance of the stylus pen.

As shown in FIG. 9 to FIG. 12, in a third embodiment of the present invention, the pen head configuration structure for a capacitive touch-screen stylus pen comprises a pen head 5, a support saddle 6, a backing member 7 and a lock pin 8.

The pen head 5 is a spherical crown member made of a conductive material. The pen head 5 has a working end face 51 at a lower end face thereof to touch the touchscreen. The upper part of the pen head 5 is a spherical head 52. The spherical head 52 is formed with a taper seat 521 which is tapered from top to bottom. The spherical head 52 is formed with a sphere seat 522 near a middle part thereof at the lower part of the taper seat 521. The depth of the sphere seat 522 is greater than the radius of a sphere 71 of the backing member 7 and less than the diameter of the sphere 71. The backing member 7 and the pen head 5 form a universal connection relationship. The taper seat 521 is adapted for movement of the backing member 7. The support saddle 6 comprises a lower pen head connecting portion 61 and an upper pen body connecting portion 62. The pen head connecting portion 61 is formed with a spherical seat 63 to accommodate the spherical head 52 of the pen head 5, such that the pen head 5 and the support saddle 6 form the universal connection relationship. The support saddle 6 further has a sink hole 64 disposed above the spherical seat 63 to accommodate the backing member 7. The support saddle 6 has lock holes 65 at two sides thereof to communicate with the middle part of the sink hole 64.

The backing member 7 is a rod member. The backing member 7 has the sphere 71 at a lower end thereof and a rod body 72. The sphere 71 is located in the sphere seat 522 of the spherical head 52 of the pen head 5. The rod body 72 is inserted into the sink hole 64 of the support saddle 6 and has a through hole 73 corresponding to the lock holes 65. The lock pin 8 is inserted in the lock holes 65 of the support saddle 6 and the through hole 73 to fix the backing member 7 to the support saddle 6. The connection of the backing member 7 and the support saddle 6 can adopt welding, riveting or adhering instead of the lock pin 8. The sphere 71 of the backing member 7 is embedded in the pen head 5. The spherical head 52 of the pen head 5 is located in the spherical seat 63 of the support saddle 6.

The pen head 5, the support saddle 6 and the backing member 7 are connected together through the pin lock 8. The universal connection relationship between the pen head 5 and the backing member 7 and the universal connection relationship between the support saddle 6 and the pen head 5 constitute the whole pen head structure as the aforesaid embodiments by using the pen body A of a roller pen to form a stylus pen. Through the universal connection relationship of the pen head 5 and the support saddle 6 fixed to the pen body A, the pen body A can be used at arbitrary angle when the stylus pen is used. However, the largest touching area between the pen head 5 and the touchscreen B can be kept, so as to ensure the operation performance of the stylus pen. The backing member 7 provides a support function to the pen head 5 made of a conductive material so that the working face of the pen head 5 to touch the touchscreen reliably.

As shown in FIG. 13 to FIG. 16, in a fourth embodiment of the present invention, the pen head configuration structure for a capacitive touch-screen stylus pen comprises a pen head 5, a support saddle 6, a backing member 7 and a conductive plate 9.

The pen head 5 is a spherical crown member made of a conductive material. The lower end face of the pen head 5 is formed with a recess 53 to accommodate the conductive plate 9. The conductive plate 9 functions as the working face to touch the touchscreen. The upper part of the pen head 5 is a spherical head 52. The spherical head 52 is formed with a taper seat 521 which is tapered from top to bottom. The spherical head 52 is formed with a through hole 523 near a middle part thereof. The diameter of the through hole 523 is greater than or equal to the diameter of a sphere 71 of the backing member 7. A reduced opening 524 is formed between the through hole 523 and the taper seat 521. The diameter of the reduced opening 524 is less than the diameter of the sphere 71 of the backing member 7. The backing member 7 and the pen head 5 form a universal connection relationship. In order to ensure flexible movement of the sphere 71 of the backing member 7, the through hole 523 has an arc surface 525 at an upper end thereof.

The configuration structure of the pen head 6 and the backing member 7 is the same as the third embodiment and won't be described hereinafter. The difference is that the pen head 5 is made of a hard material and the conductive plate 9 is as the working face to touch the touchscreen. The backing member 7 is to connect the pen head 5 and the support saddle 6. The through hole 523 is adapted to mount the backing member 7. The conductive plate 9 further has the function to block the through hole 523.

In sum, the feature of the pen head configuration structure for a capacitive touch-screen stylus pen of the present invention is the universal connection relationship between the pen head and the support saddle. When the stylus pen is operated, it can satisfy different users to hold the stylus pen at arbitrary angle. However, the largest touching area between the pen head and the touchscreen can be kept, so as to ensure the operation performance of the stylus pen.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A pen head configuration structure for a capacitive touch-screen stylus pen, comprising a pen head and a support saddle, the pen head and the support saddle being made of a conductive material, the pen head and the support saddle being connected through a universal joint, further comprising a backing member, the pen head having a working end face at a lower end face thereof to touch a touchscreen, an upper part of the pen head being a spherical head, the spherical head having a sphere seat formed therein to mate with a sphere of the backing member, the backing member and the pen head forming a universal connection relationship, the support saddle comprising a lower pen head connecting portion and an upper pen body connecting portion, the pen head connecting portion being formed with a spherical seat to accommodate the spherical head of the pen head so that the pen head and the support saddle form the universal connection relationship, the support saddle further having a sink hole disposed above the spherical seat to accommodate the backing member, the backing member being a rod member, the backing member having the sphere at a lower end thereof and a rod body, the rod body of the backing member being inserted into the sink hole of the support saddle.

2. The pen head configuration structure for a capacitive touch-screen stylus pen as claimed in claim 1, wherein the spherical head is formed with a taper seat which is tapered from top to bottom, the spherical head being formed with the sphere seat near a middle part thereof and facing downward.

3. The pen head configuration structure for a capacitive touch-screen stylus pen as claimed in claim 1 or 2, wherein the sphere seat has a depth greater than the radius of the sphere of the backing member and less than the diameter of the sphere.

4. The pen head configuration structure for a capacitive touch-screen stylus pen as claimed in claim 1, wherein the pen head is a spherical crown member made of a conductive material, the upper part of the pen head being the spherical head, a lower end face of the pen head being formed with a recess to accommodate a conductive plate.

5. The pen head configuration structure for a capacitive touch-screen stylus pen as claimed in claim 4, wherein the spherical head is formed with a taper seat which is tapered from top to bottom, the spherical head being formed with a through hole near a middle part thereof, the diameter of the through hole being greater than or equal to the diameter of the sphere of the backing member, a reduced opening being formed between the through hole and the taper seat, the diameter of the reduced opening being less than the diameter of the sphere of the backing member.

6. The pen head configuration structure for a capacitive touch-screen stylus pen as claimed in claim 5, wherein the through hole has an arc surface at an upper end thereof.

* * * * *